United States Patent [19]
Jogand

[11] 4,115,192
[45] Sep. 19, 1978

[54] FAST NEUTRON NUCLEAR REACTOR

[75] Inventor: Patrick Jogand, Aix en Provence, France

[73] Assignee: Commissariat a l'Energie Atomique, Paris, France

[21] Appl. No.: 813,324

[22] Filed: Jul. 6, 1977

[30] Foreign Application Priority Data

Jul. 6, 1976 [FR] France ............................. 76 20652

[51] Int. Cl.² ............................................. G21C 15/18
[52] U.S. Cl. ..................................... 176/40; 176/38; 176/65
[58] Field of Search ..................... 176/40, 38, 65, 52, 176/87

[56] References Cited

U.S. PATENT DOCUMENTS

| 3,548,931 | 12/1970 | Germer | 176/40 |
| 4,032,399 | 6/1977 | Defauchy et al. | 176/65 |

FOREIGN PATENT DOCUMENTS

| 2,217,863 | 12/1972 | Fed. Rep. of Germany | 176/65 |
| 1,421,826 | 1/1976 | United Kingdom | 176/65 |

Primary Examiner—Harvey E. Behrend

Attorney, Agent, or Firm—Cameron, Kerkam, Sutton, Stowell & Stowell

[57] ABSTRACT

Fast neutron nuclear reactor comprising on the inside a main vessel having a vertical axis suspended by its upper open part on a thick protective slab which seals a cavity surrounding said vessel, a volume of a liquid cooling metal and also positioned within said main vessel an inner vessel having a cylindrical wall containing the core of the reactor submerged beneath the liquid metal level, the intermediate space between the main vessel and the inner vessel having heat exchangers and pumps which pass below the level of the liquid metal, wherein the upper end of the inner vessel is covered by an inverted annular bell cap and is placed under the internal pressure of a neutral gas in order to prevent in normal operation direct communication between the hot liquid metal within the inner vessel and the cold liquid metal in the annular space between the main vessel and the inner vessel, said bell cap covering an auxiliary exchanger which externally surrounds the inner vessel in such a way that if there is a fault in the reactor and after reducing the neutral gas pressure beneath the bell cap as a result of natural convection a circulation of the liquid metal takes place beneath the bell cap of the inner vessel towards the annular space and passes through the auxiliary exchanger.

3 Claims, 2 Drawing Figures

FAST NEUTRON NUCLEAR REACTOR

BACKGROUND OF THE INVENTION

The present invention relates to a fast neutron nuclear reactor where the cooling of the core by extracting the calories released by nuclear fission is brought about by circulating a liquid metal.

The invention applies more particularly in the case of a reactor of the above type, a so-called integrated reactor, in which the volume of liquid metal, generally sodium, necessary for cooling the core is contained in an open vessel having a vertical axis called the main vessel suspended beneath a horizontal thick slab which closes a cavity containing said vessel and located in a concrete protective enclosure. The core of the reactor comprising juxtaposed fuel assemblies rests on a girder which also supports a second vessel or inner vessel having its upper end open and surrounding the core and mounted in the main vessel. In the annular space defined between the side walls of the main vessel and the inner vessel are provided heat exchangers and circulating pumps, so-called primary pumps, traversing vertical passages provided in the upper slab and which pass into the sodium volume. The hot sodium from the core, after passing through the latter from bottom to top, is collected in the inner vessel. It then leaves the latter and penetrates the exchangers where the calories obtained are transferred to a secondary fluid, the cold sodium emanating from the exchangers in the space between the two vessels being taken up by the circulating pumps and is then returned under a suitable pressure beneath the core girder and then again passes through the core.

In a special construction of a fast integrated reactor of the type indicated hereinbefore, on leaving the core located in the inner vessel the hot sodium is caused to circulate between the core and the side wall of said vessel and is then removed from the latter by tubes directly connected at the base of each exchanger with a central duct provided in the latter. Advantageously an arrangement of this type can be in accordance with that described and claimed in French patent application 760,982 of Mar. 29, 1976 entitled "Fast neutron nuclear reactor" filed in the name of the Commissariat à l'Energie Atomique.

However, in the case of the constructions described hereinbefore the hot sodium collected in the upper part of the inner vessel partly stagnates due to the fact that the tubes are located in the lower part of said vessel supplying the sodium to the exchangers. If a fault or irregularity occurs in the reactor due to the unavailability of the secondary circuits of the exchangers or the unavailability of both said secondary circuits and the primary pumps, it is necessary to be able to remove the residual heat from the reactor.

BRIEF SUMMARY OF THE INVENTION

The invention relates to an improvement made to the inner structures of a fast neutron nuclear reactor of the type indicated hereinbefore, which makes it possible to ensure in the case of a fault in the reactor that said residual heat is removed through the provision of a liquid metal circulation by natural convection.

Therefore, according to the present improvement the upper end of the inner vessel is covered by an inverted annular bell cap and is placed under the internal pressure of a neutral gas in order to prevent in normal operation direct communication between the hot liquid metal within the inner vessel and the cold liquid metal in the annular space between the main vessel and the inner vessel, said bell cap covering an auxiliary exchanger which externally surrounds the inner vessel in such a way that if there is a fault in the reactor and after reducing the neutral gas pressure beneath the bell cap as a result of a circulation of the liquid metal takes place beneath the bell cap of the inner vessel towards the annular space and passes through the auxiliary exchanger.

According to another feature of the invention, the auxiliary exchanger is carried by a cylindrical ring which is coaxial to the inner vessel and suspended beneath the slab.

According to a first embodiment, the auxiliary exchanger comprises a plurality of straight parallel vertical tubes connected at their upper and lower ends to two annular manifolds which are common to all the tubes, one manifold serving for the admission and the other for the discharge of a secondary fluid.

According to another embodiment, the auxiliary exchanger comprises two groups of separated vertical tubes joined independently in each group to two independent manifolds for the admission and discharge of a secondary fluid.

BRIEF DESCRIPTION OF THE DRAWINGS

Other features of a fast nuclear reactor improved in accordance with the present invention can be gathered from the following description of an exemplified embodiment with two variants of the auxiliary exchanger and which is given in an illustrative and non-limitative manner with reference to the attached drawings, wherein show.

DETAILED DESCRIPTION OF THE PREFERRED EMBODIMENTS

Figure 1:
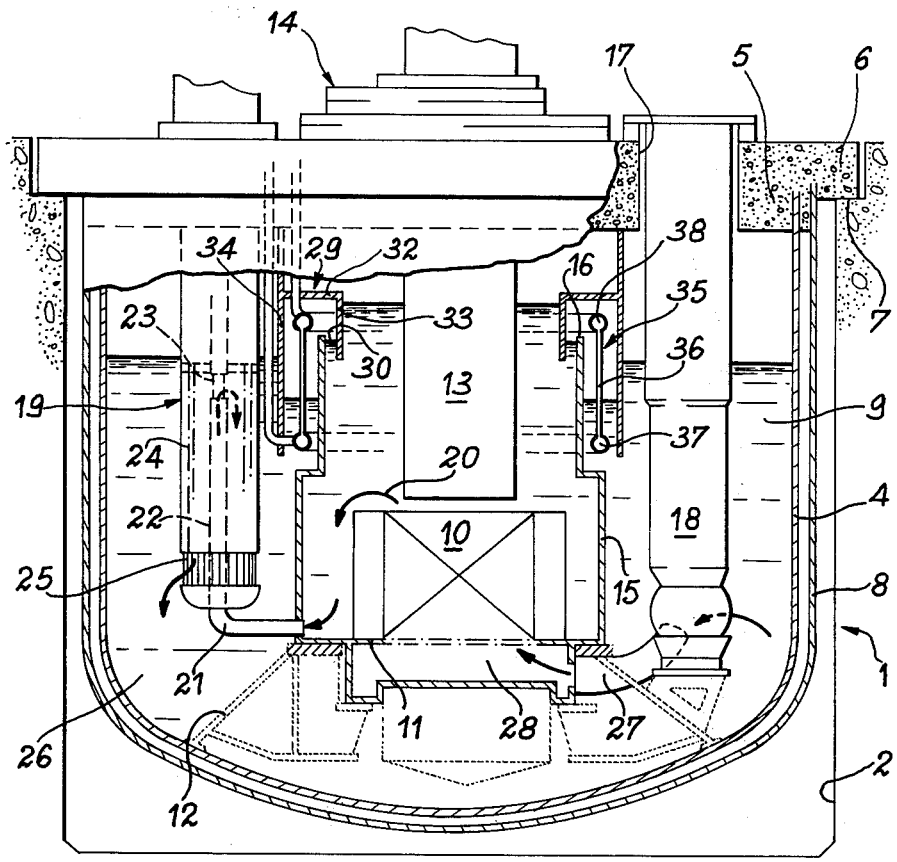
FIG. 1, a diagrammatic view in axial section of a nuclear reactor according to the invention.

In FIG. 1, 1 is a fast nuclear reactor known under the name integrated reactor shown in the form of an axial section. Within a cavity 2 in a protected enclosure 3 with thick concrete walls the installation comprises a first vessel 4 called the main vessel and having a generally cylindrical shape with a vertical axis and a substantially hemispherical base, said vessel being suspended in its upper open part beneath a horizontal sealing slab 5 having on its periphery a circular flange 6 which ensures both its positioning and support on a shoulder 7 of enclosure 3. The main vessel 4 which is externally duplicated by a second vessel 8 having parallel walls called the safety vessel and which like the first is suspended beneath slab 5 contains a suitable volume 9 of a liquid cooling metal, generally sodium. Within vessel 4 and submerged in the sodium volume is located the core 10 of the reactor which is formed by the juxtapositioning of not shown fuel assemblies positioned vertically on a lower supporting girder 11 which itself rests on the base of vessel 4 via a flooring 12.

In its central portion slab 5 also has a system of rotary buttons permitting a handling and control member 13 shown diagrammatically in FIG. 1, to be positioned above the reactor core 10 in order to control the operation of the latter and ensure the requisite handling operations of the fuel assemblies within the latter.

Once again in conventional manner, core 10 is surrounded by an inner vessel 15 coaxial to the main vessel 4 and resting on girder 11, said vessel 15 having an open upper end 16 positioned at a lower level than that of the liquid sodium in vessel 4. The upper slab 5 also has a series of passages 17 permitting the mounting of pumps 18 and heat exchangers 19 within the main vessel 4 between the latter and inner vessel 15. Said apparatuses are regularly distributed about the core axis and ensure respectively the circulation of the sodium and the extraction of the calories produced during the passage through the core.

The liquid sodium 9 contained in vessel 4 traverses core 10 from bottom to top, is heated when in contact with the fuel assemblies and is collected in vessel 15. The hot sodium is then caused to travel between the side of the core and the surface of the inner vessel in accordance with arrows 20 and is then discharged via tubes 21 issuing into vessel 15 at its lower end on the one hand and connected directly to heat exchangers 19 on the other. To this end each tube 21 is connected to a central duct 22 in each exchanger 19, whereby the thus channelled sodium enters the exchanger via intake ports 23. The hot sodium then circulates in the exchanger in contact with a group of straight tubes 24 where the calories produced are transferred to a secondary fluid. Once cooled, the sodium leaves the exchanger by ports 25 provided at its lower end and is collected in annular space 26 defined by vessels 4 and 15. The cold sodium is then taken up by circulating pumps 18 and is forced under an appropriate pressure through pipes 27 which have a large cross-section into a manifold 28 located beneath girder 11 before again passing through the core, where it is again heated and so on.

According to the invention, the upper open end 16 of inner vessel 15 is associated with an inverted bell cap 29 which covers said vessel and makes it possible to insulate the hot sodium volume contained in vessel 15 from the cold sodium volume contained in space 26 between vessels 4 and 15. To this end the inverted bell cap 29 is placed under an appropriate pressure of a neutral gas, specifically argon, which makes it possible to maintain the sodium level 30 below the upper edge of end 16. To this end bell cap 29 has a base 32 to which are connected two parallel cylindrical rings 33 and 34 whereby the first passes into the hot sodium within vessel 15, and the second extends into the cold sodium in space 26.

According to a first embodiment of the invention illustrated in FIG. 1, ring 31 also serves to support an auxiliary exchanger 35 located around vessel 15 on the outside of the latter beneath bell cap 29. This auxiliary exchanger has a series of parallel straight tubes 36 which are regularly distributed around the vessel and joined respectively at their lower and upper ends to manifolds 37 and 38 for the admission and discharge of a suitable secondary fluid.

When the reactor is operating normally the pressure of the neutral gas beneath bell cap 29 makes it possible to maintain the sodium level 30 beneath the edge of end 16 and insulates the hot sodium volume contained in vessel 15 from the cold sodium volume in space 26. However, in the case of an accident and particularly if the pumps 18 are damaged which causes the circulation of sodium in exchangers 19 to be stopped, the residual heat in vessel 15 must be evacuated. To this end, the pressure of the neutral gas below bell cap 29 is decreased, sodium circulation taking place directly by natural convection above the edge of the upper end 16 of the inside of vessel 15 towards the outside, thus circulating in contact with tubes 36 of auxiliary exchanger 35. This leads to an adequate cooling of the sodium to permit an appropriate removal of the residual heat. Moreover, it should be noted that the solution proposed above does not take up a large amount of space in the radial direction making it possible to locate the exchanger beneath the bell cap, it merely being necessary to slightly increase the diameter. Sealing by means of an inverted bell cap makes it possible to obtain a good thermal insulation between the space which collects the cold sodium and the inside of the inner vessel which collects the hot sodium, resulting in a reduction of losses and a limitation under normal operating conditions of the heating of the upper part of said space.

Figure 2:
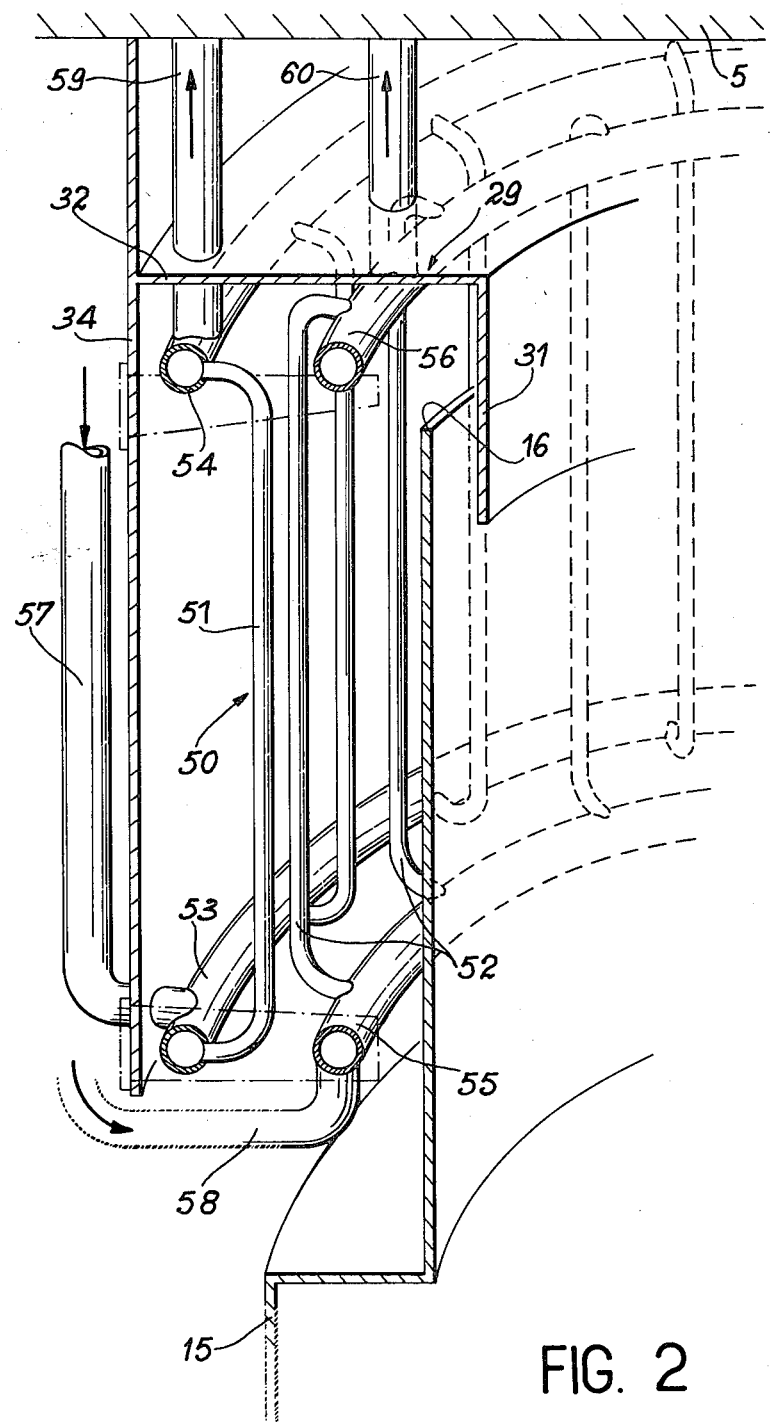
FIG. 2, a larger scale detail of a variant of the exchanger associated with the upper end of the inner vessel of the reactor of FIG. 1.

According to another embodiment illustrated in FIG. 2, the inverted bell cap 29 covering the upper end 16 of vessel 15 is associated with an auxiliary exchanger 50 having two groups of separated parallel tubes, respectively 51 and 52, joined in the first case to two toroidal manifolds 53 and 54, and in the second case to two other adjacent manifolds 55 and 56, whereby pipes 57, 58 on the one hand and 59, 60 on the other are joined to said manifolds to ensure the circulation of the secondary fluid in tubes 51 and 52. This solution increases the reliability of the assembly due to the existence of two independent groups of tubes.

The invention is not limited to the embodiments described and represented hereinbefore, and various modifications can be made thereto without passing beyond the scope of the invention.

What is claimed is:

1. A fast neutron nuclear reactor comprising on the inside a main vessel having a vertical axis suspended by its upper open part on a thick protective slab which seals a cavity surrounding said vessel, a volume of a liquid cooling metal and also positioned within said main vessel an inner vessel having a cylindrical wall containing the core of the reactor submerged beneath the liquid metal level, the intermediate space between the main vessel and the inner vessel having heat exchangers and pumps which pass below the level of the liquid metal, wherein the upper end of the inner vessel is covered by an inverted annular bell cap and is placed under the internal pressure of a neutral gas in order to prevent in normal operation direct communication between the hot liquid metal within the inner vessel and the cold liquid metal in the annular space between the main vessel and the inner vessel, said bell cap covering an auxiliary exchanger which externally surrounds the inner vessel in such a way that if there is a fault in the reactor and after reducing the neutral gas pressure beneath the bell cap as a result of natural convection a circulation of the liquid metal takes place beneath the bell cap of the inner vessel towards the annular space and passes through the auxiliary exchanger.

2. A nuclear reactor according to claim 1, wherein the auxiliary exchanger is carried by a cylindrical ring coaxial to the inner vessel and suspended beneath the slab.

3. A nuclear reactor according to claim 1, wherein the auxiliary exchanger has a plurality of vertical parallel straight tubes connected at their lower and upper ends to two annular manifolds common to all the tubes and respectively for the admission and discharge of a secondary fluid.

* * * * *